(12) United States Patent
Van De Vanter et al.

(10) Patent No.: US 7,127,704 B2
(45) Date of Patent: Oct. 24, 2006

(54) INTERACTIVE SOFTWARE ENGINEERING TOOL WITH SUPPORT FOR EMBEDDED LEXICAL CONTEXTS

(75) Inventors: Michael L. Van De Vanter, Mountain View, CA (US); Marat Boshernitsan, Berkeley, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 763 days.

(21) Appl. No.: 09/940,242

(22) Filed: Aug. 27, 2001

(65) Prior Publication Data

US 2002/0100016 A1 Jul. 25, 2002

Related U.S. Application Data

(63) Continuation-in-part of application No. 09/587,171, filed on Jun. 2, 2000, now abandoned.

(51) Int. Cl.
*G06F 9/44* (2006.01)

(52) U.S. Cl. .................. 717/112; 717/111; 717/113; 715/542

(58) Field of Classification Search ............... 717/105, 717/112, 143, 111, 113; 715/521, 542
See application file for complete search history.

(56) References Cited

U.S. PATENT DOCUMENTS

| | | | | | |
|---|---|---|---|---|---|
| 4,809,170 | A | * | 2/1989 | Leblang et al. ............. | 717/122 |
| 4,931,928 | A | * | 6/1990 | Greenfeld .................. | 717/131 |
| 5,006,992 | A | * | 4/1991 | Skeirik ....................... | 706/58 |
| 5,070,478 | A |   | 12/1991 | Abbott | |
| 5,079,700 | A | * | 1/1992 | Kozoll et al. .............. | 715/531 |
| 5,140,521 | A | * | 8/1992 | Kozol et al. ............... | 715/531 |
| 5,263,174 | A | * | 11/1993 | Layman .................... | 715/841 |
| 5,311,422 | A | * | 5/1994 | Loftin et al. .............. | 703/2 |
| 5,377,318 | A | * | 12/1994 | Wolber ...................... | 715/809 |
| 5,430,836 | A | * | 7/1995 | Wolf et al. ................ | 715/744 |
| 5,481,712 | A | * | 1/1996 | Silver et al. .............. | 717/109 |
| 5,485,618 | A | * | 1/1996 | Smith ........................ | 715/710 |
| 5,537,630 | A | * | 7/1996 | Berry et al. ............... | 715/763 |
| 5,557,730 | A | * | 9/1996 | Frid-Nielsen ............. | 715/839 |
| 5,577,241 | A | * | 11/1996 | Spencer ..................... | 707/5 |
| 5,579,469 | A | * | 11/1996 | Pike .......................... | 715/781 |
| 5,583,762 | A | * | 12/1996 | Shafer ....................... | 715/532 |
| 5,627,958 | A | * | 5/1997 | Potts et al. ................ | 715/708 |
| 5,628,016 | A | * | 5/1997 | Kukol ....................... | 717/140 |
| 5,644,737 | A | * | 7/1997 | Tuniman et al. ........... | 715/810 |
| 5,649,192 | A | * | 7/1997 | Stucky ...................... | 707/103 R |
| 5,649,222 | A | * | 7/1997 | Mogilevsky ............... | 715/533 |
| 5,671,403 | A | * | 9/1997 | Shekita et al. ............. | 707/3 |

(Continued)

OTHER PUBLICATIONS

Visual Basic for Application Unleashed, Paul Mc Fedries, Sams MacMillian Computer Publishing, ISBN 0672310465 Published Mar. 21, 1997 (Exceprts printed).*

(Continued)

*Primary Examiner*—Todd Ingberg
(74) *Attorney, Agent, or Firm*—Zagorin O'Brien Graham LLP

(57) ABSTRACT

In response to programmer input of a trigger token, a program editor creates a pair of boundary tokens encapsulating an embedded lexical context and positions an insertion point within the embedded lexical context. The operations on the embedded lexical context are preferably performed using an embeddable sub-editor specialized to the task at hand. Since boundary tokens are generated in pairs, stability of lexical boundaries is enforced. Accordingly, stable implementations of certain desirable behaviors, including language-oriented advanced program typography that is robust to user edits, are facilitated using the invented techniques.

29 Claims, 5 Drawing Sheets

U.S. PATENT DOCUMENTS

| | | | | |
|---|---|---|---|---|
| 5,673,390 A * | 9/1997 | Mueller | 714/57 |
| 5,680,630 A * | 10/1997 | Saint-Laurent | 715/534 |
| 5,694,559 A * | 12/1997 | Hobson et al. | 715/705 |
| 5,724,593 A * | 3/1998 | Hargrave et al. | 704/7 |
| 5,734,749 A * | 3/1998 | Yamada et al. | 382/187 |
| 5,737,608 A | 4/1998 | Van De Vanter | 395/701 |
| 5,740,444 A * | 4/1998 | Frid-Nielsen | 717/102 |
| 5,748,975 A | 5/1998 | Van De Vanter | 395/793 |
| 5,752,058 A | 5/1998 | Van De Vanter | 395/793 |
| 5,781,720 A * | 7/1998 | Parker et al. | 714/38 |
| 5,790,778 A * | 8/1998 | Bush et al. | 714/38 |
| 5,798,757 A * | 8/1998 | Smith | 715/709 |
| 5,802,262 A | 9/1998 | Van De Vanter | 395/180 |
| 5,805,889 A | 9/1998 | Van De Vanter | 707/512 |
| 5,813,019 A * | 9/1998 | Van De Vanter | 715/512 |
| 5,825,355 A * | 10/1998 | Palmer et al. | 715/712 |
| 5,844,554 A * | 12/1998 | Geller et al. | 715/744 |
| 5,845,120 A * | 12/1998 | Reddy et al. | 717/125 |
| 5,845,300 A * | 12/1998 | Comer et al. | 715/508 |
| 5,850,561 A * | 12/1998 | Church et al. | 715/532 |
| 5,857,212 A | 1/1999 | Van De Vanter | 707/519 |
| 5,859,638 A * | 1/1999 | Coleman et al. | 715/786 |
| 5,872,974 A * | 2/1999 | Mezick | 717/109 |
| 5,877,758 A * | 3/1999 | Seybold | 715/866 |
| 5,905,892 A * | 5/1999 | Nielsen et al. | 717/145 |
| 5,911,059 A * | 6/1999 | Profit, Jr. | 703/23 |
| 5,911,075 A * | 6/1999 | Glaser et al. | 717/100 |
| 5,924,089 A * | 7/1999 | Mocek et al. | 707/4 |
| 5,959,629 A * | 9/1999 | Masui | 715/808 |
| 6,012,075 A * | 1/2000 | Fein et al. | 715/540 |
| 6,016,467 A * | 1/2000 | Newsted et al. | 704/9 |
| 6,018,524 A * | 1/2000 | Turner et al. | 370/392 |
| 6,023,715 A * | 2/2000 | Burkes et al. | 715/514 |
| 6,026,233 A * | 2/2000 | Shulman et al. | 717/113 |
| 6,053,951 A * | 4/2000 | McDonald et al. | 717/109 |
| 6,061,513 A * | 5/2000 | Scandura | 717/142 |
| 6,071,317 A * | 6/2000 | Nagel | 717/128 |
| 6,115,544 A * | 9/2000 | Mueller | 714/57 |
| 6,119,120 A * | 9/2000 | Miller | 707/101 |
| 6,163,879 A * | 12/2000 | Mackey | 717/111 |
| 6,205,579 B1 * | 3/2001 | Southgate | 717/173 |
| 6,247,020 B1 * | 6/2001 | Minard | 707/104.1 |
| 6,266,665 B1 * | 7/2001 | Vaidyanathan et al. | 707/7 |
| 6,275,976 B1 * | 8/2001 | Scandura | 717/120 |
| 6,305,008 B1 * | 10/2001 | Vaidyanathan et al. | 717/111 |
| 6,311,323 B1 * | 10/2001 | Shulman et al. | 717/111 |

OTHER PUBLICATIONS

"Authoring A Hypertext UNIX Help Manual", Chalres H. Franke III, et al. ACM, 1995, pp. 238-245.*
"The Design of Distributed Hyperlinked Programming Documentation", Lisa Friendly, Sun Microsystems, 1995, 25 pages.*
ProgDOC—A Program Documentation System, Volker Simonis, Wilhelm-Schickard-Institut Fur Informatik, 27 pages 2003.*
"Literate Programming Simplified", N. Ramsey, IEEE Software, vol. 11, Issue 5, Sep. 1994, pp. 97-105.*
"User Interaction in Language-Based Editing Systems", Van De Vanter, Michael et al, UMI, 1992, Whole Manual.*
Automatically Generating Visual Syntax-Directed Editors, Farahangiz Arefi et al, Communications ACM, vol. 33, No. 3, Mar. 1990, pp. 349-360.*
"Interactive Editing Systems: Part I", Norman Meyrowitz et al, Computing Surveys, vol. 14, No. 3, Sep. 1982, pp. 321-352.*
Interactive Editing Systems: Part II, Norman Meyrowitz et al, Computing Surveys, vol. 14, No. 3, Sep. 1982, pp. 353-415.*
Rolf Bahlke and Gregor Snelting, "The PSG System: From Formal Language Definitions to Interactive Programming Environments," *ACM Transactions on Programming Languages and Systems* vol. 8, No. 4 (Oct. 1986), pp. 547-576.
R. A. Balance, S. L. Graham and M. L. Van De Vanter, "The Pan Language-Based Editing System," *ACM Transactions on Software Engineering and Methodology*, vol. 1, No. 1 (Jan. 1992), pp. 95-127.
P. Borras et al., "CENTAUR: the system," *Proceedings ACM SIGSOFT '88: Third Symposium on Software Development Environment* (Nov. 1988), pp. 14-24.
V. Donzeau-Gouge et al., "Programming Environments Based on Structured Editors: The MENTOR Experience," *Interactive Programming Environments*, David R. Barstow et al., editors, McGraw-Hill, New York, NY (1984), pp. 128-140.
Bernard Lang, "On the Usefulness of Syntax Directed Editors," *Advanced Programming Environments. Lecture Notes in Computer Science*, vol. 244, Reidar Conradi et al, editors, Springer Verlag, Berlin (1986), pp. 47-51.
S. Letovsky and E. Soloway, "Delocalized Plans and Program Comprehension," *IEEE Software EE* (May 1986), pp. 41-49.
Lisa Rubin Neal, "Cognition-Sensitive Design and User Modeling for Syntax-Directed Editors," *Proceedings SIG-CHI Conference on Human Factors in Computing Systems*, Toronto, Canada (Apr. 1987), pp. 99-102.
David Notkin, "The GANDALF Project," *Journal of Systems and Software* vol. 5, No. 2 (May 1985), pp. 91-105.
T. Reps and T. Teitelbaum, *The Synthesizer Generator Reference Manual, Texts and Monographs in Computer Science*, 3rd Ed., Springer-Verlag, NY, 1989, 180 pages.
E. Soloway and K. Ehrlich, "Empirical Studies of Programming Knowledge," *IEEE Transactions on Software Engineering*, vol. SE-10, No. 5 (Sep. 1984), pp. 595-609.
Richard M. Stallman, "EMACS: The Extensible, Customizable, Self-Documenting Display Editor," *Proceedings of the ACM-SIGPLAN SIGOA Symposium on Text Manipulation, SIGPLAN Notices*, vol. 16, No. 6 (Jun. 8-10, 1981), pp. 147-156.
T. Teitelbaum and T. Reps, "The Cornell Program Synthesizer: A Syntax-Directed Programming Environment," *Communications of the ACM*, vol. 24, No. 9 (Sep. 1981), pp. 563-573.
M. Van De Vanter et al., "Coherent User Interfaces for Language-Based Editing Systems," *International Journal of Man-Machine Studies*, vol. 37, No. 4 (1992), pp. 431-466.
Michael L. Van De Vanter, "Practical Language-Based Editing for Software Engineers," *Software Engineering and Human-Computer Interaction: ICSE '94 Workshop on SE-HCI: Joint Research Issues, Sorrento, Italy, May 1994 Proceedings*, Lecture Notes in Computer Science, vol. 896, Richard N. Taylor and Joelle Coutaz, editors, Springer Verlag, Berlin (1995), pp. 251-267.

* cited by examiner

INTERACTIVE SOFTWARE ENGINEERING TOOL WITH SUPPORT FOR EMBEDDED LEXICAL CONTEXTS

RELATED APPLICATIONS

This application is a continuation-in-part of U.S. application Ser. No. 09/587,171, filed Jun. 2, 2000, now abandoned the entirety of which is incorporated herein by reference.

BACKGROUND OF THE INVENTION

1. Field of the Invention

The present invention relates generally to interactive software engineering tools including editors for source code such as a programming or mark-up language, and more particularly to a language-based editing architecture with support for embedded lexical contexts.

2. Description of the Related Art

Source code plays a major role in most software engineering environments, yet it has always been difficult for software engineers to interact with such code. A common problem encountered by programmers when interacting with source code is that prior art program editors, while often language-sensitive, build upon fragile representations that are ill-suited to the manipulation of multiple embedded syntactic structures, for which behaviors would ideally be defined in accordance with distinct lexical rules. As a result, such prior art program editors are typically limited in their specialization of behaviors and those specialized behaviors provided often exhibit instability in the face of interactive edits. As will now be described, a particularly common instability often results in confusing language-based display (e.g., text formatting or pretty printing, linguistically-driven typography, etc.) and can result in the loss of previous linguistic analysis of program structures being entered.

FIG. 1 depicts a conventional computing system 10 with which a programmer or other user may enter or edit source code. System 10 includes a computer system 20 having at least one CPU 30 and memory (MEM) 40 contained therein. Memory 40 typically includes both volatile and non-volatile memory or storage. A portion of the volatile memory is typically used as a text buffer 50. The programmer or other user enters source code into computer system 20, typically using a keyboard 60 and often augmented by use of a mouse or trackball 70. In general, text buffer 50 is used to represent information, sometimes referred to as a data model.

Typically, software executable on CPU 30 provides functionality of an editor environment, including display and other functionality appropriate to a particular language context for which the software is intended. Sometimes, editor or editor-like facilities may be provided within other software environments. For example, editor facilities are commonly provided within integrated software engineering tools or environments, including within source level debuggers, source analyzers, viewers, etc. Furthermore, such editor facilities may be provided or embedded within other types of systems, e.g., to support scripting or macro language facilities of a word processing, publishing, spreadsheet or other application. In each case, editor facilities provide display and/or rendering functionality, which is often implemented as software executable by computer system 20, and which displays or renders characters, symbols or graphics corresponding to the information represented in text buffer 50.

Often, display functionality renders information represented in text buffer 50 accordingly to stylistic rules appropriate for a particular language type (e.g., for a comment, string literal or tag). For example, portions of text may be rendered as display 90 on monitor 80 using particular typefaces, font sizes, colors and/or attributes that are appropriate or conventional for a particular language type. In general, such functionality operates on contents of text buffer 50 and applies what is believed, rightly or wrongly, to be the appropriate stylistic rules. Unfortunately, associations between particular contents of text buffer 50 and appropriate stylistic rules are typically quite fragile, particularly in the presence of editing operations. Accordingly, if provided, language-based display (e.g., text formatting or pretty printing, linguistically-driven typography, etc.) is somewhat unstable in prior art editor designs. This instability will be better understood in the context of the following example.

Referring now to FIG. 2A, assume that a programmer enters the following keystrokes:

$$S = E + \text{"\}"};$$

using system 10. Corresponding contents of text buffer 50 are illustrated in FIG. 2A and a corresponding display (e.g., display 90) is rendered to monitor 80 as shown in FIG. 1.

A typical prior art code-oriented editing environment recognizes language constructs of entered text by performing pattern matching or lexical (language) analysis on context of text buffer 50. Referring illustratively to the contents shown in FIG. 2A, a pattern matching or lexical analysis facility recognizes the group 110 of characters or tokens, namely "}", as a string literal. Having properly recognized string literal from amongst the remaining source language contents of text buffer 50, a prior art editing environment of system 10 may apply special typographical attributes such as special coloring when displaying characters or symbols of the string literal on monitor 80.

Assume now that the programmer wishes to edit the current line so it will eventually read as follows:

$$S = \text{"\{"} + E + \text{"\}"};$$

To carry out the above edit, the programmer typically repositions cursor 100 on display 90 so that a corresponding insertion point exists before the existing character E, then begins typing the additional text (namely, the characters "{" +) using keyboard 60. Underlining is used herein as a notational convention to better delimit the relevant characters. The initial double quote character " is the first such character entered and FIG. 2B illustrates the state of text buffer 50 after its entry, but before remaining characters of the desired edit are entered. The illustrated state highlights the fragility of many prior art editor implementations. Typically, such editor systems are unable to properly handle display of text buffer 50 contents after entry of an initial double quote character " that is intended by the programmer to signify start of a new string literal.

Instead, given the text buffer 50 state illustrated in FIG. 2B, a pattern matcher or lexical analyzer of the editor typically re-analyzes the text buffer contents and erroneously assumes that portion 120 of the buffer contents, namely "E+", itself corresponds to a string literal consisting of the characters E+, where underlining is used herein to better delimit the relevant characters. Accordingly, upon programmer entry of the triggering keystroke ", such an editor makes the erroneous assumption (relative to the programmer's intent) that "E+" is itself a string literal and modifies typographic attributes of display 90 accordingly. For example, the supposed string literal "E+" may be rendered using a fixed point font, using a color and size that have been predefined for string literal rendering. Depending on the implementation, inappropriate visual cues may extend to other portions of text buffer 50 contents. For example, since it no longer appears to be preceded by an opening double quote character ", line portion 130 (namely, the right brace character }) may be improperly interpreted as a code construct, rather than as the contents of a string literal intended by the programmer. Indeed, in an editor implementation that performs lexical analysis or even simple matching of braces, a portion may be interpreted (and visually presented) as an unbalanced brace within a context that requires an opening brace for each closing brace.

Furthermore, because the second occurrence of a double quote character " is improperly interpreted as a closing double quote character for the string literal "E+", text buffer 50 contents 140 may also be misinterpreted. For example, a lexical analyzer of the editor may identity the characters "; as an invalid lexeme. In particular, buffer contents 140 may be interpreted as the start of a string literal that lacks a closing double quote character. In some prior art editor implementations, an invalid lexeme may be rendered in such a way, e.g., in red, as to highlight invalidity for the programmer. Unfortunately, such inappropriate visual cues can be quite distracting to the programmer.

As the programmer enters additional keystrokes to complete the desired S="{"+E+"}"; entry, a typical prior art editor will continue to inappropriately interpret text buffer 50 contents. In the above example, upon completion of keystrokes for entry of the string literal "{", visual cues return to appropriate values. However, in general, a keystroke-by-keystroke interpretation of a given edit may result in an ever changing (and distracting) set of visual cues such as color, typeface or other typographic attributes. While many prior art editors exhibit such inappropriate behaviors, others may simply forgo otherwise desirable language-based features such as advanced program typography or lexical analysis on a keystroke-by-keystroke basis because of the challenges created by interactive edits. To facilitate introduction and use of such features, language-based techniques are needed which exhibit greater stability in the face of interactive edits.

To some degree, inappropriate behaviors can be avoided using language structure-based editor techniques. So-called structure-based editors use internal representations that are closely related to the tree and graph structures used by compilers and other programming tools. While, structure-based editors can greatly simplify some kinds of language-oriented services, they generally impose the requirement that the programmer edit using structural, rather than textual, commands. For example, entry of a string literal may require a structural command such as "Insert String Literal" which may be selected from a pull-down menu, bound to a key stroke sequence, such as a control or escape sequence, or invoked by some other non-lexical trigger. In general, such an editing architecture assumes that programs are intrinsically tree structured, and that programmers understand and should manipulate them accordingly. In practice, this assumption has not been borne out and structure editors have not found wide acceptance.

Some structure-based editors allow uses to "escape" structural constraints by transforming selected tree regions into plain text, but usability problems persist. The complex unseen relationships between textual display and internal representation make editing operations confusing and somewhat unpredictable because of "hidden state." In some ways, textual escapes make matters worse with a confusing and distracting distinction between those part of a program where language-based services are provided and those where they are not. Often, language services and tools stop working until all textual regions are syntactically correct and transformed back to structure.

Unfortunately, due in large measure to practical user acceptance and deeply ingrained motor learning habits that involve textual, rather than structural editing, practical code-oriented text editors emphasize a textual representation. One widely adopted code-oriented text editor, the Emacs editor, uses a purely textual representation, assisted by ad-hoc regular expression matching that can recognize certain language constructs. But, by definition, the structural information computed by simple text editors is incomplete and imprecise, and such editors cannot support services that require true linguistic analysis such as advanced program typography. At best, simple text editors typically provide indentation, syntax highlighting, and navigational services that can tolerate structural inaccuracy. Although high quality, linguistically-driven typography can measurably improve the programmer's reading comprehension, such typography is often lacking in prior art source code editors, especially when encountering malformed and fragmentary program code. Although a few text editors can perform per-line lexical analysis with each keystroke, the absence of true program representation leads to confusion in the inevitable presence of mismatched string quotes and comment delimiters.

In view of the above, techniques are desired whereby interactive software engineering tools may reliably implement behaviors including advanced program typography in accordance with a proper lexical context. In particular, techniques are desired that facilitate stable language-oriented representations in the presence of interactive edits, but which do not force a user to enter structural commands.

SUMMARY

Accordingly, it has been discovered that an interactive software engineering tool in accordance with some embodiments of the present invention can present a user with behavior that is particular to a current lexical context and further transition between lexical contexts and associated behaviors based on user entry of a transitional token without use of a structural command. Unlike structural commands employed by structure-based editors, such a transitional token is a language element of the edited content, typically source code, and therefore appears in a keystroke or other entry sequence likely to be entered by a user. For example, a user entering a line of source code that includes a string literal will, in most programming languages, enter a double quote character (") followed by the literal string and completed with entry of a closing double quote character.

In some embodiments of an interactive software engineering tool in accordance with the present invention, entry of an initial double quote character triggers creation of an embedded lexical context appropriate for the string literal, rather than the programming language statement in which the string literal appears. In this way, appropriate typographic styles may be applied and those lexical tokens characteristic of a string literal, e.g., a /n encoding of a newline or a ˆt encoding of a tab, may be appropriately recognized in the embedded string literal context. Similar facilities may be provided for other embedded lexical contexts such as for a markup language element, a comment, etc. Whatever the application, creation of the embedded lexical context is triggered not by a structural command to the interactive software engineering tool, but rather by recognition of a lexical token within the user's edit stream. In some realizations, a closing boundary token is automatically and transparently inserted into the edit stream. In such realizations, operation of the interactive software engineering tool may handle user entry of a closing boundary token (e.g., a closing double quote character) by allocating such entry against a corresponding automatically inserted closing boundary token.

In general, each user entry into the edit stream is examined to identify whether a trigger token has been entered by the programmer using a keyboard, mouse, etc., or perhaps a menu selection. An appropriate set of trigger tokens is implementation dependent and generally depends upon the programming language(s) and/or other content forms supported. Without limitation, exemplary trigger tokens include:

" (a double quote character),

/* (a multi-line comment delimiter in many programming languages),

// (a single line comment delimiter in many programming languages),

/** (a document type comment delimiter), or

< (a markup tag delimiter), where, in general, entry of a trigger token implies the existence of a boundary condition that a new grammar and syntax should now be invoked. Based on the description herein, persons of ordinary skill in the art will appreciate a wide variety of suitable trigger tokens appropriate for particular content types and lexical contexts implemented.

Upon identification of an opening trigger token, a sub-editor appropriate to the specific token is invoked and an appropriate sub-document is created. In a preferred embodiment, the sub-document is automatically bounded by a closing boundary token. In general, the boundary token preceding the sub-document, e.g., to the left, is a subdocument opening token, and the boundary token following the sub-document, e.g., to the right, is the subdocument closing token. In the example of a string literal, the opening token and the closing token are both double quote characters, although in some cases opening and closing boundary tokens may differ. On the display, a cursor is automatically placed between the opening and closing boundary tokens. Thus, if a user keystroke is the double quote character ", this trigger token is recognized as representing the start of a string literal. The appropriate sub-editor that handles string literals is invoked, and what is seen is on the computer system monitor is "[cursor]", wherein the notation [cursor] represents any suitable insertion point presentation. The programmer then enters the desired string literal. The programmer may then cursor beyond a boundary token, (e.g., beyond the closing"), whereupon the subdocument (here a string literal) is exited, and control is transparently and seamlessly returned to the parent editor. Sub-editors may also be provided for other lexical contexts including those appropriate for various types of comments, for mark-up language tags, and program code. Implementations typically include support for nested sub-documents created by nested sub-editors, each invoked upon recognition of the appropriate opening trigger token. Preferably, a software engineering tool in accordance with the present invention transparently handles programmer actions, such as manually attempting to input a closing trigger token and preventing manual deletion of one of a pair of boundary tokens unless the bounded sub-document is empty.

In one embodiment in accordance with the present invention, an interactive software engineering tool presents, for distinct portions of a single unit of source code, a user thereof with behavior according to a corresponding set of lexical rules, wherein transition of the behavior from that in accordance with a first lexical context to that in accordance with a second lexical context is based on recognition of an opening boundary token according to the first lexical context and without use of a structural command to the interactive software engineering tool. In some variations, the behavior includes linguistically-driven typography. In some variations, the behavior includes lexical analysis of text based on a then operative one of the first and the second lexical contexts. Various exemplary lexical contexts are described herein.

In another embodiment in accordance with the present invention, an interactive software engineering tool automatically inserts, in response to introduction of a language-defined opening boundary token at a cursor position in an edit buffer, a corresponding closing boundary token, such that display of edit buffer content past the cursor position maintains its pre-introduction association with a first lexical context and with linguistically-driven typography therefor, while subsequent entry at the cursor position is subject to a second lexical context.

In still another embodiment in accordance with the present invention, a method of operating an interactive software engineering tool includes rendering a display presentation corresponding to a unit of source code, the display presentation corresponding to at least a first lexical context operative at an insertion point; recognizing interactive entry of an opening boundary token at the insertion point; and in response to the recognition of the opening boundary token, creating a second lexical context operative for subsequent interactive entry at the insertion point. The second lexical context is delimited by the opening boundary token and a position in the source code immediately following the insertion point. The opening boundary token is a valid lexical token in accordance with one of the first and the second lexical context and not a non-lexical, structural command to the interactive software engineering tool. In some variations, a closing boundary token is automatically inserted. In some variations, different stylistic rule are applied to rendering of symbols within first and second lexical contexts. Various appropriate lexical contexts and boundary token instances are described herein. Various software engineering tool exploitations are also described herein.

In still another embodiment in accordance with the present invention, a computer program product is encoded in at least one computer readable medium and includes functionally-descriptive encodings of at least first and second language contexts and instructions at least partially implementing a source code editor that invokes the second language context nested within the first language context based solely on recognition of a boundary token defined by the first language context and entered at the cursor position, while maintaining pre-existing language context past the cursor position.

In still yet another embodiment in accordance with the present invention, a computer system includes a display, memory, a language-based editor program executable thereby and a buffer defined by the source code editor program and instantiable in the memory. The language-based editor program renders contents of the buffer to the display in accordance with an associated language context and recognizes entry of a transitional opening token defined by a first language context and, in response thereto, associates text subsequently entered into the buffer at an insertion point thereof with a second language context, while maintaining a pre-existing association between the first language context and contents of the buffer past the insertion point.

Other features and advantages of the invention will appear from the following description in which preferred embodiments have been set forth in detail in conjunction with the accompanying drawings.

BRIEF DESCRIPTION OF THE DRAWINGS

The present invention may be better understood, and its numerous objects, features, and advantages made apparent to those skilled in the art by referencing the accompanying drawings. In particular.

The use of the same reference symbols in different drawings indicates similar or identical items.

DESCRIPTION OF THE PREFERRED EMBODIMENT(S)

Figure 1:
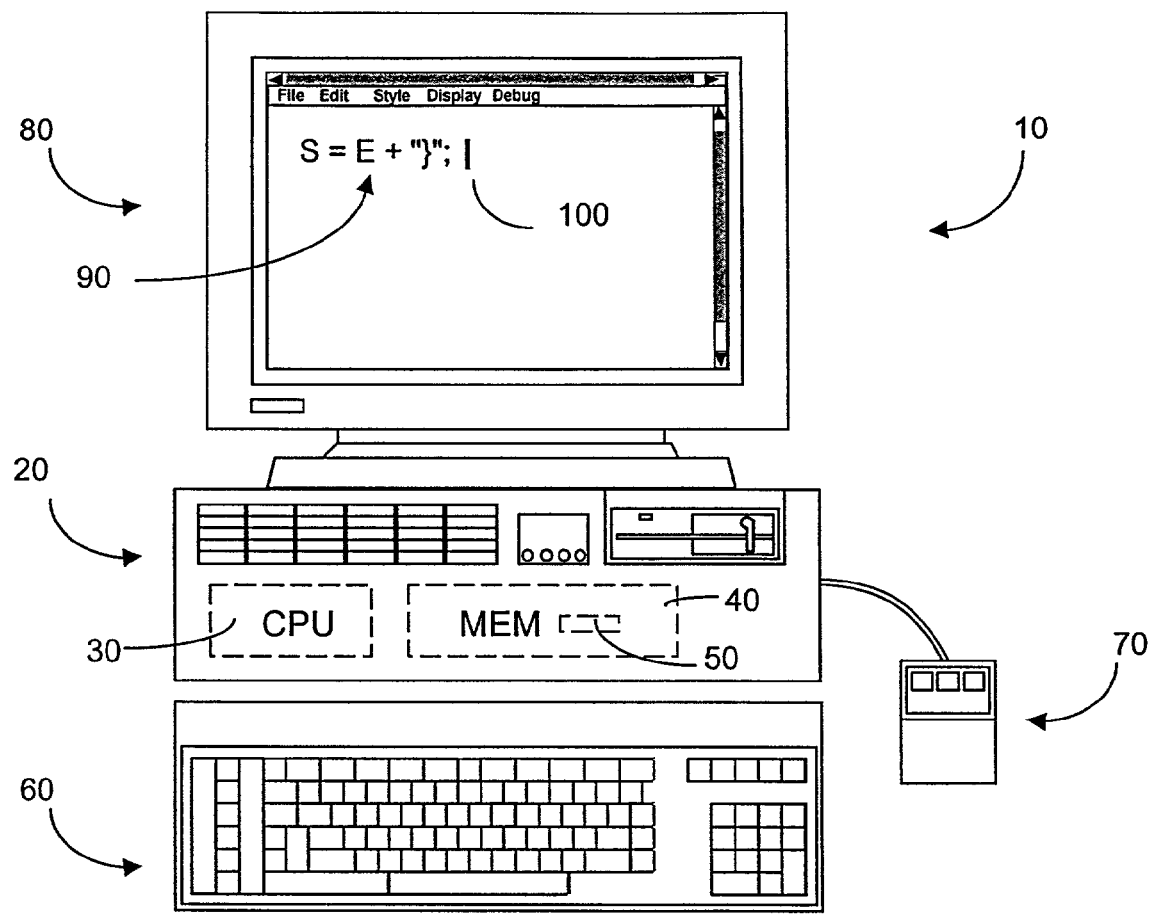
FIG. 1 depicts a computer system used as a source code editing system, according to the prior art.
Figure 2A:
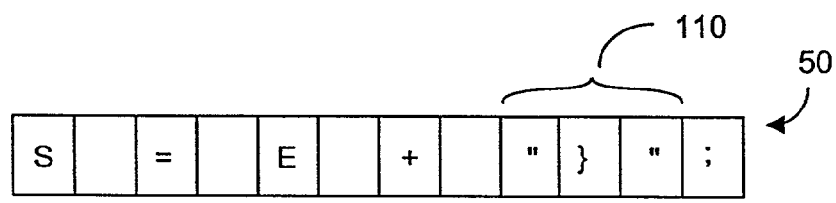
FIG. 2A depicts text buffer contents comprising program code and string literal code, according to the prior art.
Figure 2B:
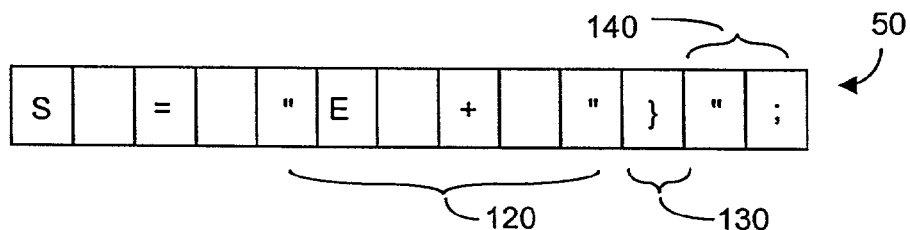
FIG. 2B depicts text buffer contents intermediate an edit change, showing code sections often misinterpreted by prior art editors.

Exploitations of the techniques of the present invention are many. In particular, a wide variety of software engineering tools that employ aspects of the present invention to facilitate language-oriented behaviors are envisioned. One exemplary software engineering tool with language-oriented behavior is a source code editor that provides advanced program typography based on lexical context. Such a source code editor provides a useful descriptive context in which to present various aspects of the present invention. Nonetheless, the invention is not limited thereto. Indeed, applications to editors, analyzers, builders, compilers, debuggers and other such software engineering tools are envisioned. In this regard, some exploitations of the present invention may provide language-oriented behaviors within suites of tools or within tools that provide functions in addition to manipulation of program code. Similarly, a specific lexical context, e.g., that typical in many programming languages of string literals, is used as an illustrative context. String literals provide a useful illustrative context because they are employed in nearly every programming language according to largely uniform conventions. Nonetheless, the invention is not limited thereto. Indeed, other illustrative contexts are specifically described and, based on the description herein, persons of ordinary skill in the art will appreciate other lexical contexts appropriate for specific implementations.

In addition, while traditional procedural or object-oriented programming languages provide a useful descriptive context, exploitations of the present invention are not limited thereto. Indeed, other software engineering tool environments such as those adapted for editing, analysis, manipulation, transformation, compilation, debugging or other operations on functionally descriptive information or code, such as other forms of source code, machine code, bytecode sequences, scripts, macro language directives or information encoded using markup languages such as HTML or XML, may also employ structures, methods and techniques in accordance with the present invention. Furthermore, the structures, methods and techniques of the present invention may be exploited in the manipulation or editing of non-functional, descriptive information, such as software documentation or even prose, as long as distinct lexical contexts are signaled by transitional tokens encoded in the descriptive information itself. Based on the description herein, persons of ordinary skill in the art will appreciate applications to a wide variety of tools and language contexts.

Accordingly, in view of the above and without limitation, an exemplary exploitation of the present invention particularly adapted to edit facilities of a software engineering tool is now described using a string literal lexical context and associated tokens merely for purposes of illustration.

Exemplary Editor Implementation

In general, techniques of the present invention may be implemented using any of a variety of editor implementations. Nonetheless, for purposes of illustration, descriptions of an exemplary set of editor implementations in U.S. Pat. No. 5,752,058, entitled "SYSTEM AND METHOD FOR INTER-TOKEN WHITESPACE REPRESENTATION AND TEXTUAL EDITING BEHAVIOR IN A PROGRAM EDITOR" and U.S. Pat. No. 5,748,975, entitled "SYSTEM AND METHOD FOR TEXTUAL EDITING OF STRUCTURALLY-REPRESENTED COMPUTER PROGRAMS WITH ON-THE-FLY TYPOGRAPHICAL DISPLAY," are each incorporated herein by reference. Based on the description herein, including the above-incorporated description, persons of ordinary skill in the art will appreciate a variety of editor implementations that may benefit from features and techniques of the present invention.

Figure 3:
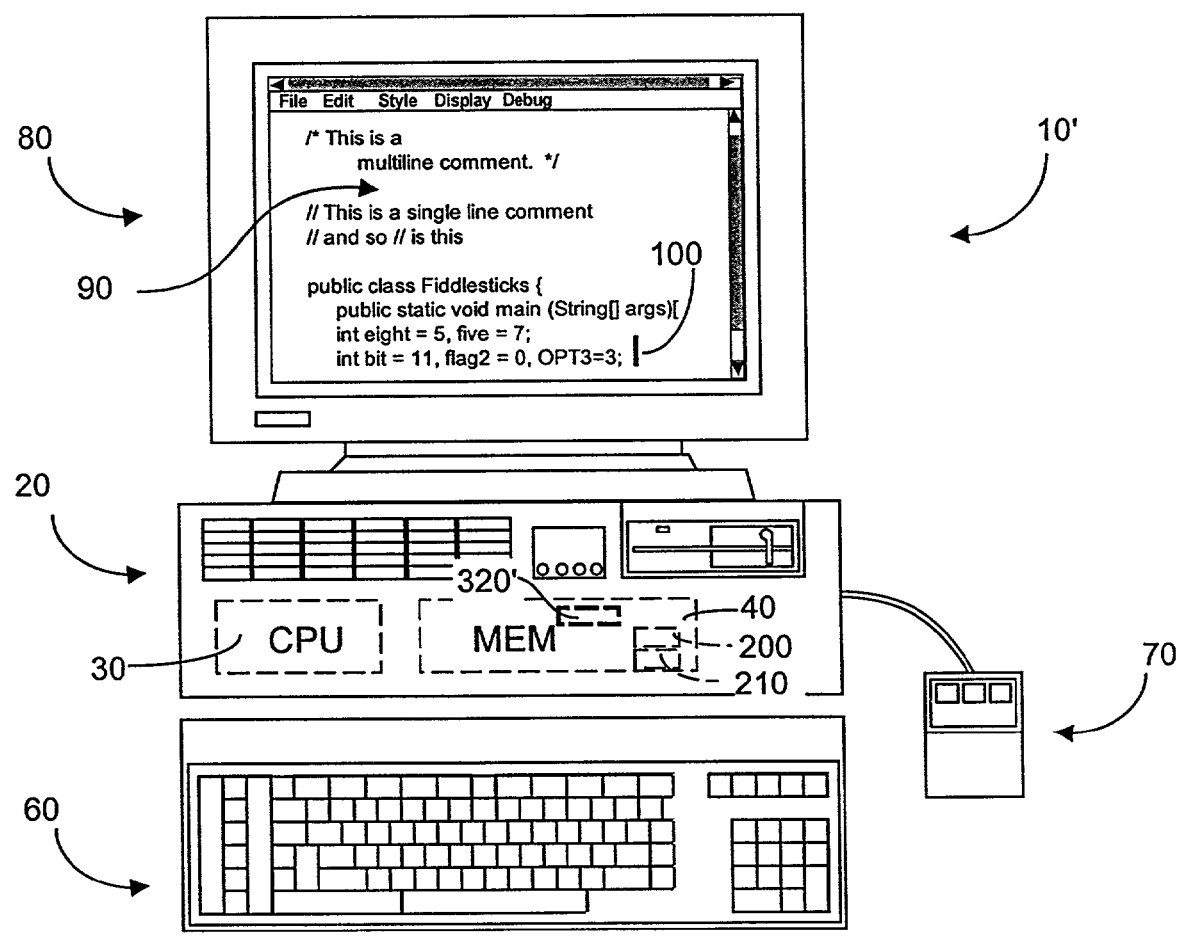
FIG. 3 depicts a computer system used as a source code editing system with embeddable source code editor modules in accordance with some embodiments of the present invention.

FIG. 3 depicts a system 10' used to edit and display source code according to some embodiments of the present invention. In some aspects, system 10' is similar to prior art system 10. However, in contrast, system 10' includes facilities to create embedded lexical contexts based on recognition of trigger tokens in an edit stream entered by a programmer. In some realizations, specialized sub-editors may be invoked within a parent editor to provide behaviors appropriate to the created lexical context. In other realizations, behavior of a single editor may be specialized for the created lexical context. In either case, embeddable sub-editors, editor modules or specializations of a generalized editor framework are depicted conceptually as sub-editors 200, 210. Persons of ordinary skill in the art will appreciate that the lexical contexts and sub-editors that provide appropriate behaviors may be nested. For example, given a particular edit stream, a current lexical context (e.g., that appropriate for comments) may be nested within a second lexical context (e.g., that appropriate for scripting language), which is itself nested within a third lexical context (e.g., that appropriate for C programming language code).

In general, a buffer 320' encodes a representation of the edited document and subdocuments. Preferably, buffer 320' provides a token-oriented representation or model that corresponds to the edit stream, wherein certain boundary tokens delimit subdocument boundaries and facilitate transitions from one lexical context to another in correspondence with navigation. In this regard, the preferred representations differ from simple text buffers often employed in the prior art, which fail to encode structural information. While a wide variety of implementations are envisioned, editor modules and buffer representations in accordance those disclosed in applicant's previously incorporated U.S. Pat. Nos. 5,752,058 and 5,748,975 provide a useful framework in which the techniques of the present invention may be implemented. As used herein, a parent editor is any of a variety of editor implementations or frameworks, including those substantially in accordance with prior art implementations, within which embedded lexical contexts may be provided in accordance with the teachings of the present invention. The editor implementations of applicant's previously incorporated U.S. Pat. Nos. 5,752,058 and 5,748,975 provide but one illustrative framework.

Figure 4:
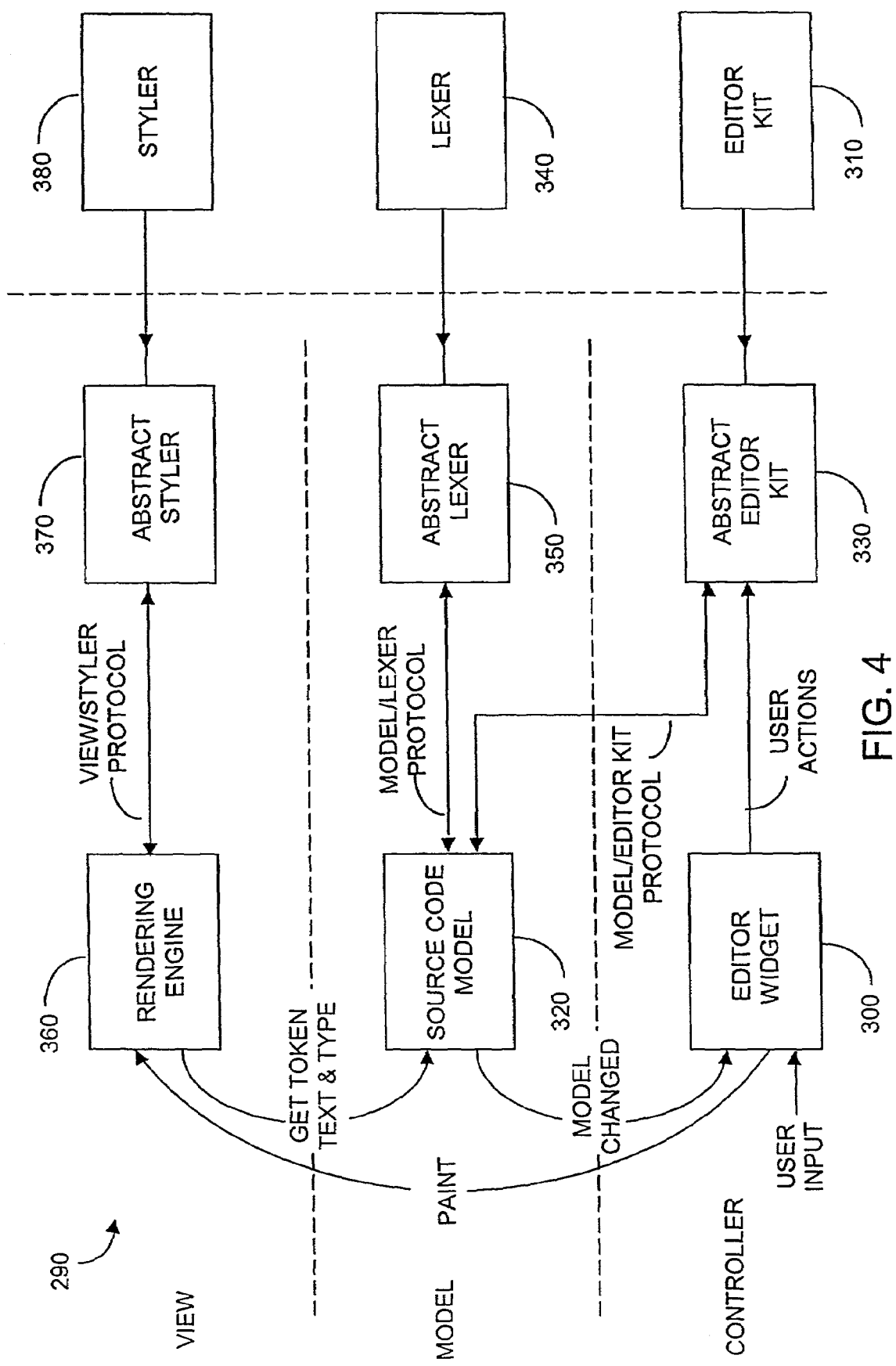
FIG. 4 depicts architecture for a source code processor sub-editor in accordance with some embodiments of the present invention.

Referring to FIG. 3, a programmer enters code using, for example, keyboard 60, a mouse or trackball to select menu items, or perhaps, in an appropriate system, using voice commands. As the programmer enters code, a parent editor within computer system 20 operates in the conventional way until an event (e.g., a keystroke, menu selection, or voice-invoked command) representing what is referred to herein as a trigger event or trigger token is encountered. Since a keyboard is commonly used, assume that programmer input is made with a keyboard. In such case, keystroke entries between such a trigger token and a closing boundary token are normally subject to a grammatical specification that is disjoint from the syntax of the rest of the language being input. By way of example and without limitation, implementations may recognize the following tokens:

"—signifies the beginning and the end of a string literal;
/*—signifies beginning of multiline comment;
*/—signifies end of multiline comment;
//—signifies single line comment;
<—signifies start of tag in certain mark-up languages;
>—signifies end of tag in certain mark-up languages
/—signifies document type comment FIG. 4 depicts architecture and components for a source code editor or sub-editor 290, according to some embodiments of the present invention. The functional decomposition of FIG. 4 is based upon a Model-View-Controller (MVC) design paradigm, and the horizontal dotted lines show division of functionality into model (M), view (V), and control (C) portions. Although the present invention is not limited thereto, implementations in accordance with the Model-View-Controller paradigm facilitate specialization of a software engineering tool to various language environments. More particularly, separation of core functionality from language specific functionality facilitates on-the-fly specialization as programmer edits trigger changes in a current lexical context. For example, the nesting of a comment-oriented lexical context within a lexical context appropriate for a Java™ programming language statement may, in some realizations in accordance with the present invention, be accomplished by swapping language modules at transitional token boundaries. Alternatively, separate instances of source code editor 290** may be instantiated for each lexical context. In general, programming techniques employed to provide transition from one lexical context to another are implementation independent and realizations in accordance with the present invention may employ any suitable implementation. Java and all Java-based marks and logos are trademarks or registered trademarks of Sun Microsystems, Inc. in the United States and other countries.

In view of the above and referring to FIG. 4, a vertical dotted line suggests how editor 290 is separated into core functionality (represented by the six modules to the left of the vertical dotted line), and language-specific functionality (represented by the three modules to the right of the vertical dotted line). As such, in constructing an editor or sub-editor specialized for a particular language, it is possible to combine the editor core (modules 300, 330, 320, 350, 360, 370) with three additional components or modules, each of which was specialized for the language: a language-specific styler 380, a language-specific lexer 340, and a language-specific editor kit 310.

The functional decomposition indicated by the vertical dotted line in FIG. 4 tends to simplify the creation of new language-specific editors, providing a reusable core that supports functionality that is not language specific. Preferably, the specific programming technique used to provide this functional decomposition is specialization, a technique known to those skilled in the art of object-oriented programming. By way of example, general purpose code may be encapsulated in a generic class (e.g., AbstractStyler) that by itself would be incapable of the required functionality. In FIG. 4, each language-specific styler 380 would likewise preferably be implemented as a class (e.g., CStyler for the C programming language). Each language-specific styler would then include the code for the abstract styler 370, using the object-oriented programming technique of inheritance. Those skilled in the relevant art will recognize that using the inheritance technique, one class (in this example CStyler) both includes and extends a so-called parent class (in this example AbstractStyler) for a specialized purpose (in this example for C programming language). The result is a styler for the C language (the class named CStyler) that was created only by adding the extra styling code that is specific to that language.

The view functionality portion of editor 290 includes rendering engine 360 and abstract styler 370. Rendering engine creates visual displays on monitor 80 (FIG. 3) based upon two sources of input: a document model 320 (the source code being viewed) and a style description that specifies typographic characteristics such as type face, size, color, background shading, etc. In the case of each token to be displayed, as supplied by the token-based document model, the rendering engine consults the current styler for relevant information. Module 380 provides the styler for the particular language being used. As noted, the styler for each language is procured by combining (through inheritance or specialization) some generic styling code (module 370) with language-specific styling information (module 380). Thus, what is seen on the monitor screen can differ from the contents of the document model.

Figure 6:
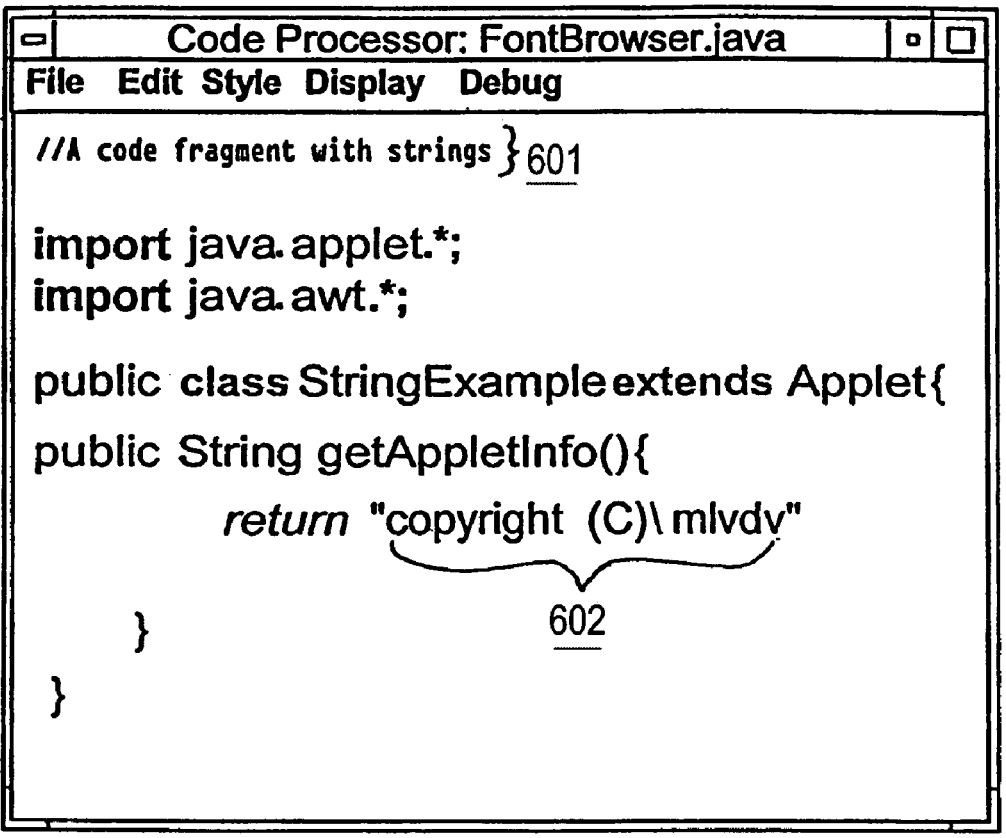
FIG. 6 is a screen image that illustrates certain advanced program typography behaviors that may be implemented with enhanced stability to user edits in accordance with some embodiments of the present invention.

Preferably styler modules facilitate a typographically-enhanced display such as shown in FIG. 6 by assigning stylistic properties to each token. The styler module lends itself to being automatically generated, although at present hand-written stylers are used. The stylers can also be used to export plain textual source code by rendering into a character stream, and dropping stylistic information that cannot be represented. Appropriate formatting can be achieved using stylers optimized for text output.

The model functionality portion of editor 290 includes source code model 320 and AbstractLexer 350. Model 320 is a data structure for representing source code as a list of tokens. This data structure need not be specialized for any particular language, and in the preferred embodiment source code model 320 is buffer 320', described with respect to FIG. 3. Lexer 340 is the mechanism whereby ordinary text (either read in from a text file or keyed in by a programmer) is analyzed and converted into the tokens that get stored in the model's data structure. The generic portion of the lexer, AbstractLexer 350, is not specific to any language. Lexer 340, on the other hand, is language-specific and contains rules for forming tokens in the particular language at hand. As noted, there might be a reusable core class named AbstractLexer and a lexer specific to the C language, that extends or specializes, e.g., a lexer named CLexer, which is a particular instance of module 340.

Lexer 340 and AbstractLexer 350 deal with rules that help define the lexemes or lexical classes of the language presently being entered by the programmer using system 10'. Changes deemed necessary to the view are effected by EditorWidget, 300, for example in response to a perceived required change determined by source code model 320 in FIG. 4. AbstractStyler 370 and styler 380 are coupled to a rendering engine 360, that in turn is coupled to source code model 320. When so required, the rendering engine will obtain the appropriate token text and type, and cause the same to be displayed on the computer monitor associated with the computer system in use. More specifically, rendering engine 360 will cause a display of source code in accordance with the requirements of advanced program typography, with a style update occurring with each keystroke as the entered source code is incrementally re-analyzed.

The controller functionality portion of editor 290 includes EditorWidget module 300 and AbstractEditorKit 330. EditorWidget module 300 is a generic manager for holding the other modules together, and is passed programmer input to computer system 10', for example input entered on keyboard 60, mouse 70, etc. The actual code that gets executed in response to user input is typically implemented by commands supplied by AbstractEditorKit 330, for example code that inserts a new character into a program. EditorWidget 300 dispatches window system events and contributes to making an editor according to the present invention a fully functionally member of the JFC widget family.

AbstractEditorKit 330 implements the intricate editing behavior described later herein, and much of the editor kit functionality is language-independent. However some EditorKit functionality may be custom-tuned for each particular language, for example adding keyboard shortcuts for inserting language constructs. Again, EditorKit functionality preferably is implemented in two parts: AbstractEditorKit 330, a generic component not specific to any language, and EditorKit 310, a language-specific component that includes commands specific to a particular language. Thus, a primary responsibility of the EditorKit is to implement user actions that require taking the context of the action into consideration. Some actions such as cursor movement commands require no changes to the source code model, and instead their execution depends only on the context (tokens) surrounding the cursor. Other actions, such as insertions and deletions, may depend not only on the modification context, but also on the state after the modification.

To facilitate this functionality, EditorKit 310 preferably commences a two-stage modification process upon any potential change responsive to a user input. First, source code model 320 is requested via Abstract EditorKit 330 to consider the effects of the change without modifying the underlying content. If a change is deemed to modify the underlying content, source model 320 so advises EditorWidget 300, and an object is produced describing the change in terms of a required model transformation. When the EditorKit regains control, it examines the transformation, and if it is not valid or has no effect the transformation is discarded, otherwise it is applied to the model. In this way, the embedded EditorKit and associated modules performs a go/no-go analysis of each keystroke to be carried out, and based upon language rules applicable to what is being entered determines legality of each entry. Such an approach represents an improvement over text buffer pattern matching techniques often employed in conventional editors, which, upon discerning what appears to be an improper pattern, simply advise the programmer than an error has occurred and produce a view that is often of little help to the programmer in identifying the error.

To recapitulate, the architecture of editor 290 is advantageously decomposed along two different dimensions: functionality (MVC) and core versus language-specific code. The result is that it is not necessary to reimplement a whole editor to achieve the design goal of having different editors for different contexts. Thus, an editor instance that specializes in general Java™ code is different from an editor instance that specializes in the contents of strings, but not completely different. Core functionality may be reused, and it is only necessary that language-specific details differ. The described MVC architecture is advantageous for display and editing, and generally reflects the design of the Java™ Foundation Classes (JFC) "Swing" toolkit. Although the described partition of functionality was achieved by subclassing (also known as inheritance or as specialization), other decompositions may instead be used. In the above-described MVC paradigm, an exemplary controller may be implemented as the so-called keystroke executive (element 130) described in applicant's U.S. Pat. Nos. 5,748,975 and 5,752,058.

Embedded Lexical Contexts

Building upon an implementation framework such as described above, a software engineering tool in accordance with the present invention supports embedded lexical contexts. In particular, such a software engineering tool transitions from a first lexical context (e.g., as presented by a parent editor) to a second lexical context (e.g., as presented by a child editor or sub-editor) based on recognition of a trigger token in an edit stream. As described above, a wide variety of lexical contexts and trigger tokens are envisioned; however, transition from a lexical context appropriate for a programming language statement (e.g., for a syntactic structure in accordance with the Java™, C, C++ or other programming language) to that appropriate for a string literal provides a useful illustration.

Figure 5:
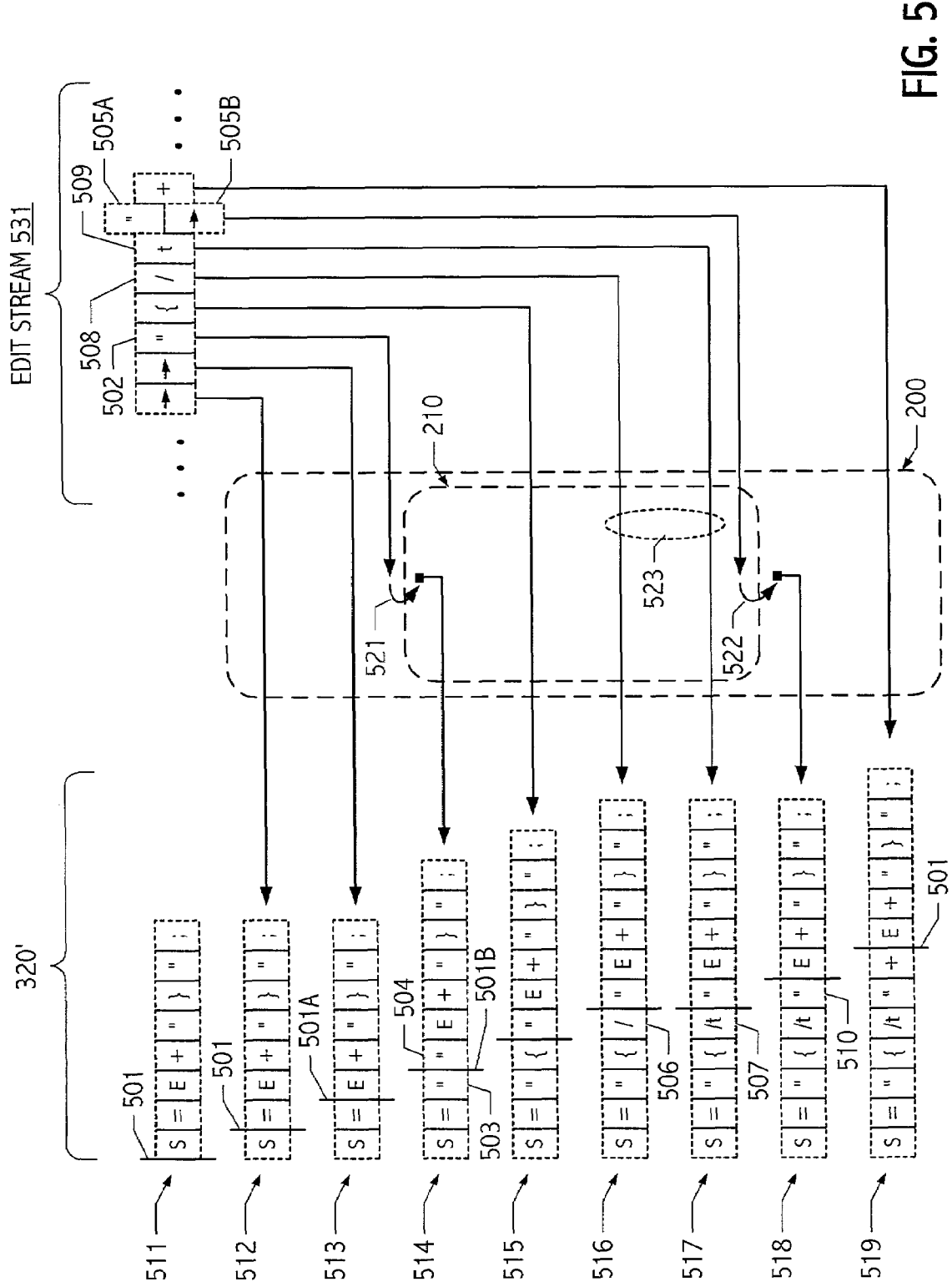
FIG. 5 depicts operation of an editor implementation and illustrative states of a token oriented buffer in response to an edit stream that triggers an embedded lexical context, all in accordance with some embodiments of the present invention.

Consider FIG. 5 in which creation of an embedded lexical context is depicted. FIG. 5 depicts an initial state 511 of a source code model (e.g., token oriented buffer 320'), in which a sequence of eight tokens S, =, E, +, ", }, ", and ;, where (as before) underlining is used as a notational convention to better delimit relevant characters. Subsequent states 512, 513, 514, 515, 516, 517, 518 and 519 of token oriented buffer 320' are also depicted. In the example of FIG. 5, most tokens correspond to a single character.

Edit stream 531 includes a sequence of keystrokes or other user inputs that illustrate invocation of an embedded lexical context based on recognition of an opening trigger token in the edit stream. Initial state 511 includes an insertion point (or cursor position ) corresponding to notation 501, positioned at the beginning of the previously illustrated line of code. While the illustration of states 511, 512, 513, 514, 515, 516, 517, 518 and 519 generally correspond with suitable display presentations thereof, it will be understood that the view seen as display 90 on monitor 80 would not generally show the "boxes" depicted in FIG. 5 to delineate tokens. Furthermore, useful and desirable program typography features (such as lexically driven selections of typeface, font size, color, whitespace attributes, etc.) that are facilitated by techniques of the present invention are not illustrated directly in FIG. 5, but will, instead, be understood in light of the description that follows.

Given the initial state of token oriented buffer 320', two successive cursor control entries in edit stream 531 (e.g., a pair of right directional control keystrokes) move insertion point 501 through token-oriented buffer 320'. A subsequent keystroke 502 is evaluated by an editor framework (not specifically shown) that implements a first lexical context 200. That keystroke, namely a double quote character, is recognized in first lexical context 200 as an opening trigger token for a second lexical context that may be embedded therein. Accordingly, in response to recognition of the opening trigger token, the editor framework invokes (521) a second lexical context 210 and makes corresponding changes to token oriented buffer 320', as illustrated by state 514. In the first lexical context 200 and, in particular, at insertion point 501A, entry of a double quote character is recognized as an opening trigger token that signifies a string literal lexical context. Because string literals are preceded and followed by a double quote character, the editor framework inserts corresponding tokens 503 and 504 into token oriented buffer 320' and places insertion point 501B therebetween.

Although it is typical of many programming languages for a lexical context to be bounded by opening and closing tokens that are both explicitly represented as tokens visible to a user, persons of ordinary skill in the art will recognize that some lexical contexts may be implicitly closed by other language artifacts. For example, in some realizations, an end of line token may close a lexical context. In others, another opening token may implicitly close a lexical context. In general, appropriate syntactic rules are application dependent. Accordingly, while the illustration of FIG. 5 includes express insertion of a closing double quote as a display visible closing token, persons of ordinary skill in the art will appreciate other exploitations in which a closing token may be explicitly inserted but not user visible or in which a closing token is implicit.

Once second lexical context 210 has been invoked, additional elements of edit stream 531 are recognized and otherwise processed in accordance with a set of lexical rules appropriate for the body of a string literal. In most programming language implementations, string literals are composed of characters in accordance with the ASCII character set; however, more generally, other more extensive character sets such as those based on the Unicode standard may be employed. Such character sets may be particularly useful in implementations that are adapted for, or contemplate, multilingual plain text. In addition, lexical rules for string literals often contemplate additional elements that encode a tab, newline, carriage return, etc. For example, a tab representation commonly employed is the sequence of characters /t. Recognizing the wide variety of character sets that may be employed in any particular implementation, illustrations herein are presented in the context of one such character set, namely the familiar ASCII character set with familiar extensions such as a /t encoding for tab, /n encoding for newline, // encoding for a forward slash, /" encoding the double quote character as literal text, etc.

In view of the above, the editor framework evaluates subsequent elements of edit stream 531 according to lexical rules appropriate for the body of a string literal. In particular, the opening brace character { is recognized as a valid single character token and added to token oriented buffer 320' contents as illustrated in state 515. Subsequent element 508 of edit stream 531 is also evaluated accordingly to the set of lexical rules appropriate for the body of a string literal (e.g., as implemented by lexical context 210). In this regard, handling of element 508 (i.e., a single forward slash character) is illustrative. As suggested above, the forward slash character has special meaning in typical definitions of a string literal lexical context. In particular, the forward slash character / is not, by itself, a valid token. Accordingly, one suitable implementation of an editor framework that builds on techniques of the present invention, recognizes the forward slash character / as an invalid (i.e., incomplete) token and includes the corresponding invalid token entry 506 in token oriented buffer 320'.

Depending on the design choices made in a particular implementation of the editor framework, display presentation of a corresponding forward slash character / may highlight the invalid or incomplete token. For example, some implementations of the editor framework may render text corresponding to an invalid or incomplete token in red rather than a more subdued black for text corresponding to a valid token. Persons of ordinary skill in the art will recognize that techniques in accordance with the present invention facilitate tailoring of editor behavior (e.g., rendering or recognition behavior) in accordance with rules of a current lexical context. For example, a forward slash character / entered at a position in edit stream 531 corresponding to first lexical context 200 could, consistent with that lexical context, be recognized as a valid token, namely one signifying a division operation.

Returning to the illustration of FIG. 5, a subsequent element 509 of edit stream 531 is recognized (523) by the editor framework operating in accordance with second lexical context 210, as the completion of a valid string literal token /t encoding for a tab. Accordingly, token oriented buffer 320' is updated as shown in state 517 to include the corresponding token 507. Depending on the design choices made in a particular implementation, corresponding text could be rendered in accordance with a general style appropriate for normal string literal text or, alternatively, using a style defined for valid tokens recognized as a character set extension, sometimes referred to as an escape sequence. As described elsewhere herein, techniques in accordance with the present invention both facilitate such advanced program typography and enhance its stability in the face of user edits.

Continuing with the illustration of FIG. 5, subsequent element (e.g., 505A or 505B) of edit stream 531 is interpreted by the editor framework as signifying an exit or return (522) from second lexical context 210. In some realizations, recognition (e.g., from edit stream 531) of a closing token appropriate for a particular lexical context (e.g., a double quote character in a string literal lexical context) is advantageously accrued against an already represented closing boundary token (e.g., token 510). Accordingly, conventional programmer interaction with the editor is facilitated and advantages of an embedded lexical context are achieved without modification of ingrained typographic habits of programmers. As illustrated in FIG. 5, programmer entry of either the appropriate closing boundary token (e.g., character 505A) or an appropriate positional control (e.g., right cursor control 505B) causes the editor framework to return from embedded lexical context 210. Subsequent elements of edit stream 531 (e.g., the + character) are recognized by the editor framework operating in accordance with first lexical context 200.

Some implementations of editors in accordance with the present invention provide interlocks to ensure that the programmer does not manually delete one (but not the other) of a pair of boundary tokens. For example, in some implementations an attempt to delete either an opening or closing double quote token that delimits a non-null string literal may be ignored. For example, a familiar look and feel is largely preserved by moving over, rather than deleting, the token in question. Alternatively, an error message or other warning may be provided. In some implementations, if the embedded lexical context bounded by the boundary tokens is empty, manual deletion of one boundary token may be interpreted as deletion of the entire embedded lexical context.

While the illustration of FIG. 5 emphasized recognition and handling of a string literal lexical context embedded within a lexical context appropriate for a given line of program code, persons of ordinary skill in the art will appreciate the application of techniques of the present invention to other lexical contexts and corresponding boundary tokens. For example, similar techniques can be employed to provide appropriate sub-editors or child editors in response to recognition of other triggering tokens, e.g., recognition of an opening < for mark-up language entries, /*, //, /** for various types of comments, etc. In each case, recognition of an opening trigger token causes the editor framework to invoke a sub-editor (or embedded lexical context) appropriate therefor. Typically, both opening and closing boundary tokens are added to a buffer in response to such recognition. Preferably, an editor framework is merely specialized to provide sub-editor behavior in accordance with an appropriate set of lexical rules, although in some implementations invocation of an entirely distinct sub-editor implementation may be appropriate. Whatever the implementation, recognition of a trigger token in the edit stream causes invocation of an embedded lexical context and subsequently presented elements of an edit stream are evaluated, recognized and/or rendered in accordance with rules associated with the embedded lexical context until recognition of a token or handling of a positional control indicates a lexical boundary crossing or until recognition of an additional token triggers the embedding of still another lexical context.

FIG. 6 illustrates a screen presentation of a code fragment that includes a string literal and which is suitable for rendering as display 90 on monitor 80 (recall FIG. 3). Using techniques in accordance with the present invention, a software engineering tool that recognizes embedded lexical contexts can facilitate advanced typography that is dynamically updated with each keystroke and which is robust to insertions of content. Content (e.g., text) may be formatted and rendered in accordance with rules appropriate to an associated lexical context. Depending on the implementation, rendering styles may be customized to suit individual programmer preferences or in accordance with suitable conventions or conventions implemented by a particular tool set. For example, on suitable configuration may cause comments to appear in one color and font type, and cause source code to be displayed in another font, color, and perhaps with different indentation, etc.

Although shown in monochrome, FIG. 6 depicts a screen image in which text associated with distinct lexical contexts is rendered in accordance with distinct rendering styles (i.e., type face, font size, highlight, foreground and background color, emphasis etc.). For example, at least three lexical contexts are illustrated: a comment lexical context 601, a code lexical context 600 and a string literal lexical context 602. In a typical implementation, comment lexical context 601 and string literal lexical context 602 are embedded within code lexical context 600 and edit behaviors, opening trigger token recognition and navigation across lexical context boundaries is as described above. Given the stability of lexical context boundaries provided by implementations in accordance with the present invention, stability of screen presentations is also enhanced. Focusing illustratively on lexical contexts associated with the illustrated fragment, rendering styles may be selected to enhance readability.

For example, for text associated with code lexical context 600, tokens recognized as include directives such as "import" may be displayed with a brown font, while scope directives such as "public" may be displayed with an orange font, and language keywords such as "class" or "extends" may be displayed with a green front. Tokens that convey nesting or hierarchical information (e.g., periods and wildcard characters in "java.applet.*" or opening and closing braces) may be rendered in black, while programmer declared variables or functions (e.g., StringExample or getAppletInfo( )) may be rendered in purple. In general, appropriate selections of rendering styles will be in accordance with human factors and/or user preferences and the invention is not limited to any particular selection. Embedded contexts are rendered in accordance with other styles. For example, embedded string literal context 602 may be displayed largely as black type on a blue background with special tokens recognized therein displayed in red. Invalid tokens may be displayed using additional visual cues. Embedded comment lexical context 601 may similarly be displayed in accordance with a distinct set of lexically based rules. In a simple form, color and indenting may be particular to formatting conventions for comments. In some more sophisticated realizations, lexical analysis of comments themselves may facilitate rendering that highlights directives to automatic documentation generators (see e.g., the JavaDocs @param constructs included in comments of the code illustrated in Tables 1 and 2). Whatever the particular lexical contexts supported and whatever the particular display conventions or preferences implemented, persons of ordinary skill in the art will appreciate that the enhanced lexical context boundary stability afforded by implementations in accordance with the present invention in turn facilitates lexically-driven program typography that is, itself, stable in the face of programmer edits.

Sub-editor Implementations

As noted, it is entirely possible and desirable for sub-editors (and associated lexical contexts) to be nested within other sub-editors (and associated lexical contexts). Accordingly, a given editor (and lexical context) may have a parent relationship with one sub-editor and embedded lexical context, while having a child relationship with another editor and lexical context within which the given editor is itself embedded. Any of a variety of programming techniques may be employed to provides such nesting; however, object-oriented techniques including specialization are presently preferred. Java™ programming language technology provides one suitable implementation environment.

Table 1 and Table 2 below provide two exemplary Java™ technology interfaces for the present invention. These interfaces depict how editor instances may communicate with one another to coordinate responses to ordinary editing commands near the boundary between an outer (or parent) editor instance and an embedded (or child) editor instance. The exemplary interfaces facilitate programmer visible behavior that is transparent across parent-child editor boundaries. The code of Tables 1 and 2 is merely illustrative, and other interfaces in accordance with the present invention may be employed to smoothly and transparently traverse editor boundaries using languages and technology other than Java™ technology.

TABLE 1

PARENT EDITOR - CHILD EDITOR INTERFACE

```
/**
 * An interface to be implemented by any editor that will have at least one
 * child editor instance embedded within, which is to say, any editor that
 * will play the role of parent in an embedding relationship among editor
 * instances. These methods permit the parent to be called by the child
 * editor when needed to respond to some programmer input.
 */
public interface ParentEditor {
    /**
     * Instructs the editor to acquire keyboard input focus from the
     * window system and to position the cursor at the boundary of a
     * child editor. This allows a child to "move" the cursor
     * over the boundary from child into parent.
     *
     * @param child The child editor at whose boundary the cursor
     * should be positioned.
     *
     * @param before Specifies at which side of the child editor the
     * cursor should be positioned: before if true, after if false.
     **/
    public void takeFocus (ChildEditor child, boolean before);
    /**
     * Instructs the editor to delete a subdocument of the document
     * being viewed, as well as the child editor associated with the
     * subdocument. This permits editing operations initiated from
     * within a child editor to have the effect of deleting the whole
     * subdocument, not just the subdocument's contents (which could
     * be accomplished purely within the child editor).
     *
     * @param child The child editor whose subdocument is to be
     * deleted.
     */
    public void deleteChild(ChildEditor child);
}
```

TABLE 2

EDITOR-EDITOR AS CHILD EDITOR INTERFACE

```
/**
 * An interface to be implemented by any editor whose instances may be
 * embedded within another editor instance, which is to say: any editor
 * that will play the role of child in an embedding relationship. These
 * methods permit the child to be called by the parent editor when needed
 * to respond to some programmer input.
 */
public interface ChildEditor {
    /**
     * Allows a parent editor to determine whether the subdocument
     * associated with a child has any content at all. Some editing
     * actions in the parent might, in the case of child editor whose
     * contents are empty, lead to the deletion of the subdocument and
     * its corresponding child editor.
     *
     * @return true if the associated subdocument is empty
     */
    public boolean isEmpty();
    /**
     * Allows a parent editor to determine whether an embedded editor
     * is prepared to acquire keyboard input focus. If not, a parent
     * editor may well chose to interpret navigation commands at the
     * child's boundary so that they just pass over the particular sub
```

TABLE 2-continued

EDITOR-EDITOR AS CHILD EDITOR INTERFACE

```
     * document/editor with no interaction.
     *
     * @return true if the editor can and is prepared to acquire keyboard
     * input focus.
     **/
    public boolean canTakeFocus();
    /**
     * Instructs the editor to acquire keyboard input focus from the
     * window system and to position the cursor within the editor. This
     * allows a parent to "move" the cursor over the boundary from
     * parent into a child.
     *
     * @param offset The character position at which the cursor should
     * be placed. If the specified position is negative, then position the
     * cursor at the extreme right position within the subdocument.
     **/
    public void takeFocus (int offset);
}
```

In summary, it will be appreciated that the present invention addresses challenges that have been exclusive in the art. Implementations that employ techniques in accordance with the present invention may provide a visually rich but otherwise unobtrusive editing experience. Keystroke sequences familiar to users of software development environments typically have their intended effect, with the added bonus of fine-grained, lexically-driven behavior including visual feedback. The programmer is aided rather than distracted by the displayed information, and is free to concentrate more completely on the task at hand, namely understanding and writing source code. Further, the rich display engine provided presents opportunities for tools to present information by modulating the source code display to suit the task at hand. Although the preferred embodiment advantageously provides sub-editors that are embeddable, an editor architecture could be provided in which a relatively complex master editor was used without embeddable sub-editors. However, the use sub-editors that are embeddable, advantageously simplifies overall system design and more particularly simplifies the design of each specialized sub-editor.

While the invention has been described with reference to various embodiments, it will be understood that these embodiments are illustrative and that the scope of the invention is not limited to them. Many variations, modifications, additions, and improvements are possible. In particular, a wide variety of lexical contexts may be supported. For example, in addition to the string literal lexical context described in detail, other lexical contexts such as those appropriate to markup languages, comments, even multimedia content may be supported. Enhanced stability of lexical boundaries facilitates stable implementations of language-oriented behaviors, such as advanced program typography and on-the-fly lexical analysis. While the description herein has focused largely on program typography as an illustrative language-oriented behavior, the invention is not limited thereto. Indeed, any lexically-driven behavior may benefit from the enhanced stability of lexical boundaries provided by techniques of the present invention. While certain illustrative programming language constructs have been illustrated, persons of ordinary skill in the art will appreciate a wide variety of alternatives based on the description herein.

More generally, plural instances may be provided for components described herein as a single instance. Boundaries between various components, operations and data stores are somewhat arbitrary, and particular operations are illustrated in the context of specific illustrative configurations. Other allocations of functionality are envisioned. Structures and functionality presented as discrete in the exemplary configurations may be implemented as a combined structure or component. These and other variations, modifications, additions, and improvements may fall within the scope of the invention as defined in the claims that follow.

What is claimed is:

1. An interactive software engineering tool embodied as executable instructions in at least one, computer readable medium, which, for distinct portions of a single unit of source code, presents a user thereof with behavior according to a corresponding set of lexical rules, wherein transition of the behavior from that in accordance with a first lexical context to that in accordance with a second lexical context is based on recognition of an opening boundary token according to the first lexical context and without use of a structural command to the interactive software engineering tool while maintaining a pre-existing lexical context past an insertion point of the opening boundary token in an edit buffer.

2. An interactive software engineering tool as recited in claim 1,
wherein the behavior includes linguistically-driven typography.

3. An interactive software engineering tool as recited in claim 1,
wherein the behavior includes lexical analysis of text based on a then operative one of the first and the second lexical contexts.

4. An interactive software engineering tool as recited in claim 1,
wherein the distinct portions are delimited by the opening boundary token and a corresponding, automatically-added closing boundary token.

5. An interactive software engineering tool as recited in claim 1, wherein the first and second lexical contexts respectively correspond to one of:
a source language lexical context and a textual comment lexical context;
a source language lexical context and a string literal lexical context;
a source language lexical context and a character lexical context; and
first and second source language lexical contexts.

6. An interactive software engineering tool as recited in claim 1, wherein the single unit of source code is one of:
a line, statement or phrase;
a function, procedure or method; and
a markup language element, thereof.

7. An interactive software engineering tool embodied as executable instructions in at least one, computer readable medium, which that, in response to introduction of a language-defined opening boundary token at a cursor position in an edit buffer, automatically inserts a corresponding closing boundary token, such that display of edit buffer content past the cursor position maintains its pre-introduction association with a first lexical context and with linguistically-driven typography therefor, while subsequent entry at the cursor position is subject to a second lexical context.

8. An interactive software engineering tool as recited in claim 7,
wherein display of symbols entered into the second lexical context is in accordance with linguistically-driven typography distinct from that employed in the first lexical context.

9. An interactive software engineering tool as recited in claim 7,
wherein lexical analysis of symbols entered into the second lexical context is in accordance with lexical rules distinct from that employed for the first lexical context.

10. An interactive software engineering tool as recited in claim 7,
wherein the second lexical context is delimited by the opening and closing boundary tokens.

11. An interactive software engineering tool as recited in claim 7, wherein the first and second lexical contexts respectively correspond to one of:
a source language lexical context and a textual comment lexical context;
a source language lexical context and a string literal lexical context;
a source language lexical context and a character lexical context; and
first and second source language lexical contexts.

12. A method of operating an interactive software engineering tool, the method comprising:
rendering a display presentation corresponding to a unit of source code, said display presentation corresponding to at least a first lexical context operative at an insertion point;
recognizing interactive entry of an opening boundary token at the insertion point; and
in response to said recognition of said opening boundary token, creating a second lexical context operative for subsequent interactive entry at the insertion point, wherein the second lexical context is delimited by said opening boundary token and a position in the source code immediately following the insertion point while maintaining a pre-existing lexical context past the insertion point,
wherein said opening boundary token is a valid lexical token in accordance with one of the first and the second lexical context and not a non-lexical, structural command to the interactive software engineering tool.

13. A method as recited in claim 12, further comprising:
in response to said recognition of said opening boundary token, automatically inserting at said position in the source code immediately following the insertion point, a closing boundary token.

14. A method as recited in claim 12,
wherein stylistic rules applied to rendering of symbols within the second lexical context differ from those applied to rendering of symbols within the first lexical context.

15. A method as recited in claim 12,
wherein lexical rules applied to recognition of tokens within the second lexical context differ from those applied to recognition of tokens within the first lexical context.

16. A method as recited in claim 12,
wherein the first lexical context is a programming language lexical context;
wherein the second lexical context is string literal lexical context; and
wherein the opening boundary token is a quote (") character.

17. A method as recited in claim 12,
wherein the first lexical context is a programming language lexical context;
wherein the second lexical context is character lexical context; and wherein the opening boundary token is a single quote (') character.

18. A method as recited in claim 12,
wherein the first lexical context is a programming language lexical context;
wherein the second lexical context is textual comment lexical context; and
wherein the opening boundary token is one of:
   a multiple line comment token (/*);
   a single line comment token (//); and
   a document type comment token (/**).

19. A method as recited in claim 12,
wherein the first and second lexical contexts correspond to respective programming language lexical contexts.

20. A method as recited in claim 12,
wherein at least one of the first and second lexical contexts is a markup language lexical context.

21. A method as recited in claim 12,
wherein transitions between the first and second lexical contexts are performed in response to navigation events and in response to entry of valid lexical tokens such that the transitions are transparent to a user of the interactive software engineering tool.

22. A method as recited in claim 12,
wherein transitions between the first and second lexical contexts are performed in response to navigation events and in response to entry of valid lexical tokens such that a user of the interactive software engineering tool need not employ structural commands therefor.

23. A method as recited in claim 12, wherein the interactive software engineering tool includes one or more of:
   an editor;
   a source-level debugger; and
   a source analyzer.

24. A method as recited in claim 12, wherein said unit of source code includes one or more of:
   a line;
   a statement;
   a markup language element; and
   a function or procedure.

25. A computer program product encoded in at least one computer readable medium and comprising:
   functionally-descriptive encodings of at least first and second language contexts; and
   instructions at least partially implementing a source code editor that invokes the second language context nested within the first language context based solely on recognition of a boundary token defined by the first language context and entered at a cursor position, while maintaining pre-existing language context past the cursor position.

26. The computer program product of claim 25, embodied as one or more of:
   an editor;
   a source-level debugger; and
   a source analyzer.

27. The computer program product of claim 25, embodied, at least in part, as a language specialization component for integration with a software engineering tool.

28. The computer program product of claim 25,
wherein the at least one computer readable medium includes at least one of magnetic storage medium, optical storage medium, electronic storage medium, a network medium, and wireline medium.

29. A computer system comprising:
   a display;
   memory;
   a language-based editor program executable by the computer system; and
   a buffer defined by the language-based editor program and instantiable in the memory,
   wherein the language-based editor program renders contents of the buffer to the display in accordance with an associated language context, and
   wherein the language-based editor program recognizes entry of a transitional opening token defined by a first language context and, in response thereto, associates text subsequently entered into the buffer at an insertion point thereof with a second language context, while maintaining a pre-existing association between the first language context and contents of the buffer past the insertion point.

* * * * *